United States Patent [19]

Nagasaka et al.

[11] Patent Number: 4,916,283

[45] Date of Patent: Apr. 10, 1990

[54] WATER COOLING PLASMA ARC WORKING APPARATUS

[75] Inventors: Moritoshi Nagasaka, Ibaragi; Kikuo Terayama, Ikeda; Toshihiko Okada, Takatsuki; Masanobu Uchida, Suita; Hirokazu Kubo, Takatsuki, all of Japan

[73] Assignee: Daihen Corporation, Osaka, Japan

[21] Appl. No.: 342,475

[22] Filed: Apr. 24, 1989

[30] Foreign Application Priority Data

Apr. 26, 1988 [JP] Japan ............................ 63-56114[U]
May 20, 1988 [JP] Japan ............................ 63-67110[U]

[51] Int. Cl.[4] ............................................ B23K 9/00

[52] U.S. Cl. .......................... 219/121.51; 219/121.54; 219/121.49; 219/75

[58] Field of Search ...................... 219/121.54, 121.51, 219/121.49, 121.52, 121.57, 74, 75, 61.7, 137.62, 136, 137 R

[56] References Cited

U.S. PATENT DOCUMENTS

| | | | |
|---|---|---|---|
| 3,646,311 | 2/1972 | Cameron et al. | 219/121.57 |
| 4,125,754 | 11/1978 | Wasserman et al. | 219/121.49 |
| 4,700,315 | 10/1987 | Blackburn et al. | 219/121,57 |
| 4,814,577 | 3/1989 | Dallavalle et al. | 219/121.54 |

*Primary Examiner*—M. H. Paschall
*Attorney, Agent, or Firm*—Scully, Scott, Murphy & Presser

[57] ABSTRACT

A plasma arc working apparatus of water cooling type provides a circulation system for circulating cooling water through a circulation passage in order to cool a working plasma arc torch and an introduction device for introducing pressurized gas into the circulation passage in order to drain the cooling water remaining in the circulation passage forcibly therefrom when the power switch for supplying electric power to the working apparatus is switched off.

5 Claims, 9 Drawing Sheets

WATER COOLING PLASMA ARC WORKING APPARATUS

BACKGROUND OF THE INVENTION

1. FIELD OF THE INVENTION

The present invention relates to improvements for water cooling plasma arc working apparatuses.

2. Description of the Prior Art

In a conventional water cooling plasma arc working apparatus, water for cooling a working torch thereof is supplied, via a stop cock, from a source of industrial water or city water or by a so called cooling water circulator for supplying cooling water from a reservoir tank to respective working torches using a water supplying pump.

FIG. 10 shows a conventional water cooling plasma arc working apparatus with a cooling water circulating system.

As shown therein, a cooling water circulator 1 provided with a reservoir tank 11, a water supplying pump 12 and an electric motor 13 for driving the pump 12 water cooling plasma arc working torch 5 is cooled with cooling water supplied by the water pump 12 through a supplying conduit 14 such as a hose. Hot water having used for cooling the torch is discharged through a discharging conduit 15, to the reservoir tank 11. A working power source unit 2 for supplying working power provides an electric power transformer circuit for transforming commercial power to a direct current or suitable for plasma are working, a control circuit for controlling start and stop of the power supply and the supply of plasma-forming gas and an electro-magnetic valve 201 for starting and stopping the supply of plasma-forming gas. The working power source unit 2 and the plasma arc torch 5 are connected with a torch cable 4 including a power cable, a supply hose for plasma-forming gas, a signal cable for a torch switch 501 for manually operating start and stop of the plasma arc working and circulating hoses 14 and 15 for cooling water. A work piece 6 is connected to one of output terminals of the power source unit 2 by another power cable. This power source unit 2 is connected, via a connecting cable 8, to a commercial alternating current source of single or three phases. The water pump 12 of the cooling water circulator 1 is started before the start of working operation and is kept running until the end of daily operation.

FIG. 11 shows a connection circuit of the conventional apparatus shown in FIG. 10 with external devices.

A reference numeral 7 denotes a power switch and, when it is switched on, the alternating electric power is supplied to the working power source unit 2 and the electric motor 13 for driving the water pump 12 and, accordingly, the supply of cooling water is started.

Another reference numeral 202 indicates the control circuit of the working power source unit 2 to which the electro-magnetic valve 201 for supplying plasma-forming gas and the torch switch 501 are connected.

As is well known to those skilled in the art, the torch 5 provided with a main electrode 52 and a tip electrode 55 having a passage for cooling water therein and, thereby, it is cooled.

In operation of the apparatus shown in FIGS. 10 and 11, when the torch switch 501 is switched on, the control circuit 202 activates the electro-magnetic valve 201 to start the supply of plasma-forming gas. After a predetermined time interval, the working electric power is supplied between the torch 5 and the work piece 6 and desired working operation is started after the well-known plasma arc starting process.

If the torch switch 501 is switched off upon finishing the working operation, the electric power supply is suspended to cut plasma arc and, after a predetermined time interval, the electro-magnetic valve 201 is closed to stop the supply of plasma-forming gas.

Further, the supply and stop of cooling water is controlled by operating the stop cock 16 manually.

FIG. 12 shows a cross-section of a tip portion of a conventional plasma arc torch 5 of water cooling type which provided with a protection cap 57 for covering the tip electrode 55 from outside thereof and a detection means for detecting a mounted state of the protection cap 57.

In FIG. 12, reference numerals 51 to 55 respectively denote electrodes and electrode support members made of an electrically conductive material, a main electrode 52 supported on the tip portion of the first electrode support member 51; an insulation sleeve arranged therearound, a second electrode support member arranged around the insulation sleeve 53 and a tip electrode 55 supported on the tip portion of the second electrode support member 54 which provides a jet hole 551 for spouting a plasma jet at the center portion of the tip thereof. Further, reference numerals 56, 57 and 58 denote a torch body made of an insulating material, the protection cap covering the tip electrode 55 from outside and a conduit for cooling water. The cooling water flowing from the supplying hose 14 cools the main electrode 52 directly and thereafter, is drained from the torch 5 through the drain hose 15 after flowing passages indicated by arrows in FIG. 12. Gas for forming a plasma arc such as pressurized air or oxygen is supplied into a space defined between the main electrode 52 and the tip electrode 55, as indicated by an arrow in FIG. 12 and then, spouted from the jet hole 551.

Further, there are provided with a pair of detection mechanisms 66 and 66 at the tip portion of the torch 5. Each is comprised of a terminal element 62 to which a lead line 61 is connected, a detection pin 63 movable in the axial direction (vertical direction) of the torch 5, and a compression spring 64 arranged between the terminal element 62 and the detection pin 63 and an O-ring 65 for restricting an excessive downward displacement of the pin 63 in $Y_1$ direction.

In the above mentioned structure, when the protection cap 57 is mounted on the tip of the torch body 56, it pushes each detection pin 63 upwardly (in the Y2 direction) against the spring force of the spring 64. Each detection pin 63 contacts with the corresponding terminal element 62 via a spring 64. As the result, the pair of detecting mechanisms 66 and 66 are electrically connected with each other by a conductive layer having been applied on the upper end of the protection cap 57. Only in this conductive state between the pair of detection mechanisms 66 and 66, the working operation is allowed to start.

On the other hand, when the protection cap 57 is dismounted from the torch 56,,each detection pin 63 is moved downwardly (in the Y1 direction) by each spring 64 until stopped by the O-ring 65 as a stopper and, thereby, the pins 63 and 63 are brought into an electrically disconnected state with each other. Thus, each detection and, thereby, a detection signal is outputted to the control circuit to cut off the power supply to the electrodes 52 and 55.

In the operation of the torch shown in FIG. 12, a high voltage of a high frequency generated by a high frequency generator 67 is applied, via a capacitor 68, between the main electrode 52 and the tip electrode 55 to generate a so-called pilot arc. This pilot arc is spouted from the jet hole 551 of the tip electrode 55 by the action of a flow of the plasma forming gas. When the torch 5 is brought near the work piece 6 while keeping the pilot arc, a working arc is generated between the main electrode 52 an the work 6. Once the working arc has been generated, the pilot arc disappears because of a resistance 69 connected on the way of the current path for generating the pilot arc. The high frequency generator 67 is stopped when the pilot arc is generated once.

In the conventional plasma arc working apparatus as shown in FIGS. 10 to 12, the water pump 12 for supplying cooling water is driven always regardless to the actual working operation and, due to the high duty ratio thereof, a high capacity is needed and the life thereof is extremely shortened.

Further, if it becomes necessary to clean the hoses 14 and 15 or to exchange the main electrode 52 and/or the tip electrode, the stop cock 16 is operated to stop the supply of cooling water at first. However, such a maintenance operation as mentioned above is troublesome because an operator has to drain remaining water from the hoses 14 and 15 and the torch 5 in order to avoid an accidental leak of water. Of course, the power supply to the torch 5 is cut off by operating the manual torch switch in order to avoid an accidental electric shock upon the maintenance operation. In the type of torch shown in FIG. 12, the power supply to the torch 5 is automatically cut off by a detection signal which is generated by the pair of detection mechanisms 66 and 66 when the protection cap 57 is removed from the torch body 56.

Further, in the conventional water cooling plasma arc working apparatus, the circulated water is discharged from the reservoir tank 11 downwardly. Due to this, as shown schematically in FIG. 13, water in the tank 11 is apt to scatter outside from an exit of air thereof in operation of the cooling water circulator. Such a leak of water is dangerous because it may invite slip accidents, corrosion of other equipments and/or electrical shocks.

SUMMARY OF THE INVENTION

An essential object of the present invention is to provide a plasma arc working apparatus of water cooling type wherein start and stop of a cooling water circulator is controlled in accordance with start and stop of power supply to a plasma arc torch thereof.

Another object of the present invention is to provide a plasma arc working apparatus of water cooling type wherein water remaining in a circulation circuit thereof is automatically drained therefrom when the power supply to the power source unit is stopped.

A further object of the present invention is to provide a plasma arc working apparatus of water cooling type which has a reservoir tank which is able to prevent water in the tank from scattering or leaking outside thereof.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 9A:
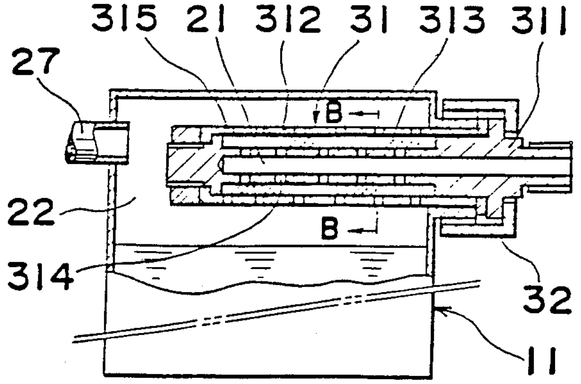
Figure 9B:
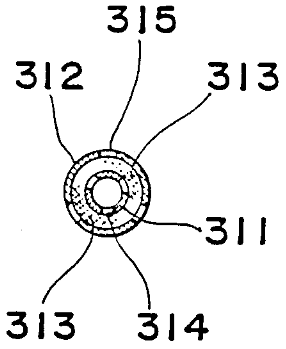
FIG. 9(B) is a cross-sectional view along B—B line of FIG. 9(A)
Figure 10:
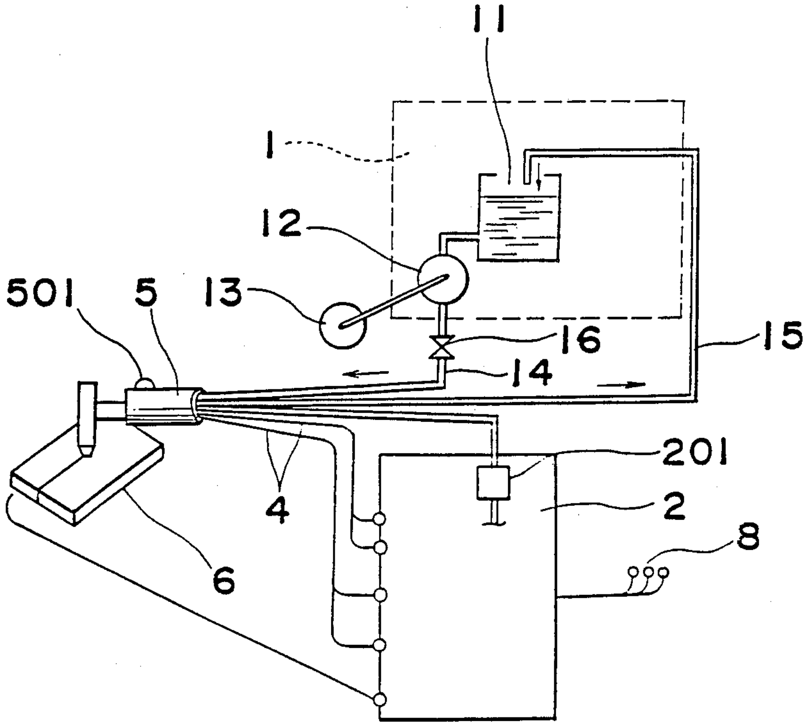
Fig. 10 PRIOR ART
FIG. 10 shows a cooling water circulating system of a conventional plasma arc working apparatus of water cooling type.
Figure 11:
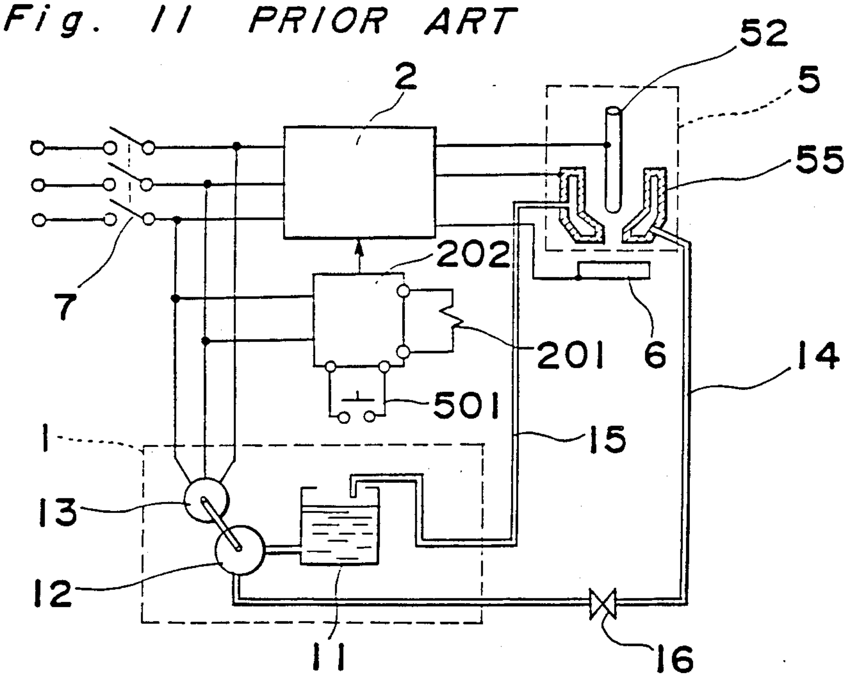
Fig. 11 PRIOR ART
FIG. 11 shows a block diagram of an electric circuit of the conventional plasma arc working apparatus shown in FIG. 10.
Figure 12:
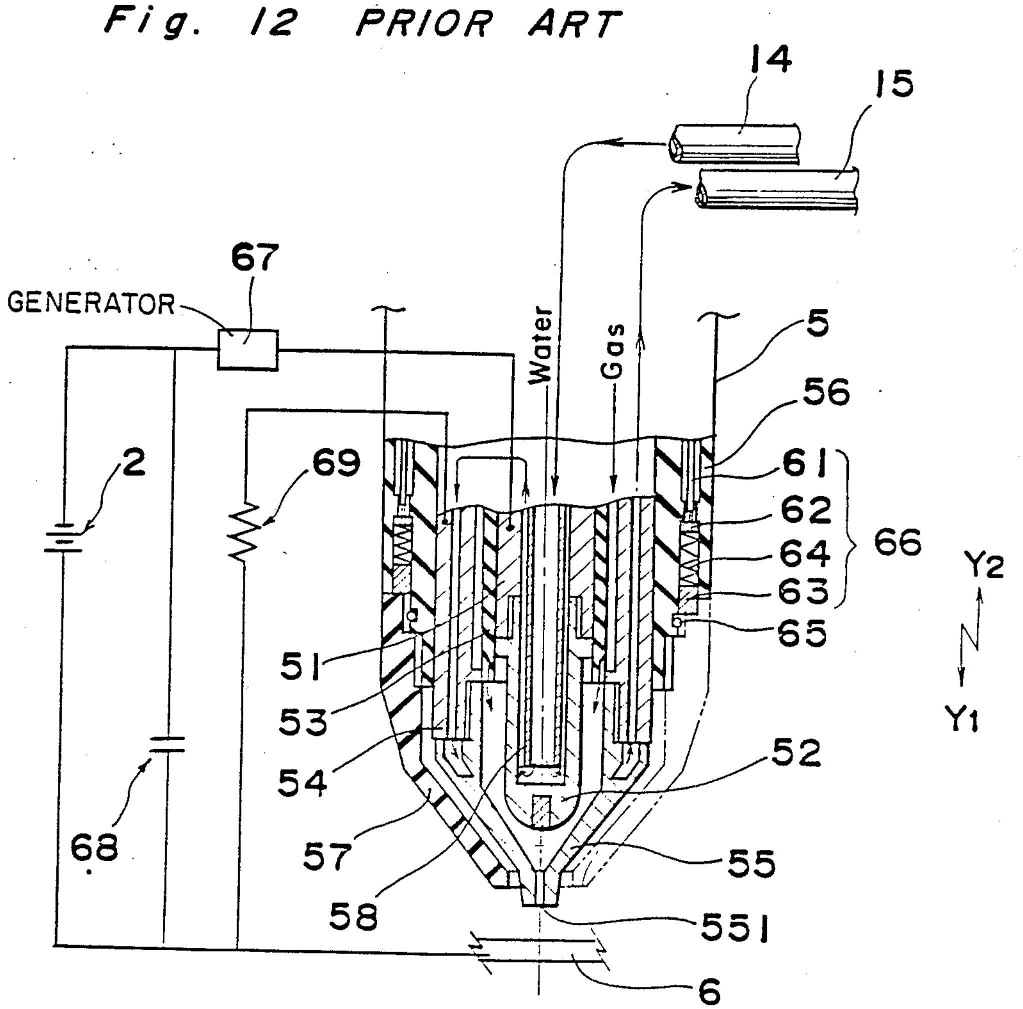
Fig. 12 PRIOR ART
FIG. 12 is a partial cross-sectional view of a conventional plasma arc torch having a protection cap.
Figure 13:
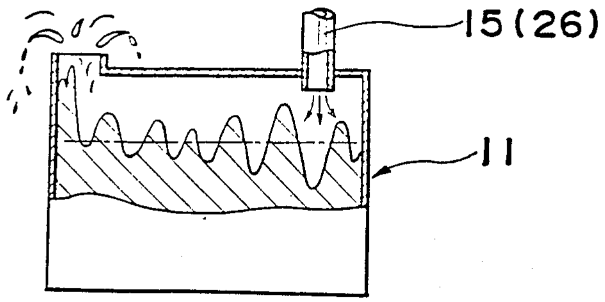
Fig. 13 PRIOR ART
FIG. 13 is an explanatory view for showing a conventional reservoir tank of the water cooling system of the conventional plasma arc working apparatus.

Through all of FIGS. 1 to 9, portions having reference numerals same as those in FIGS. 10 to 12 correspond to respective portions of the conventional plasma arc working apparatus of water cooling type.

Figure 1:
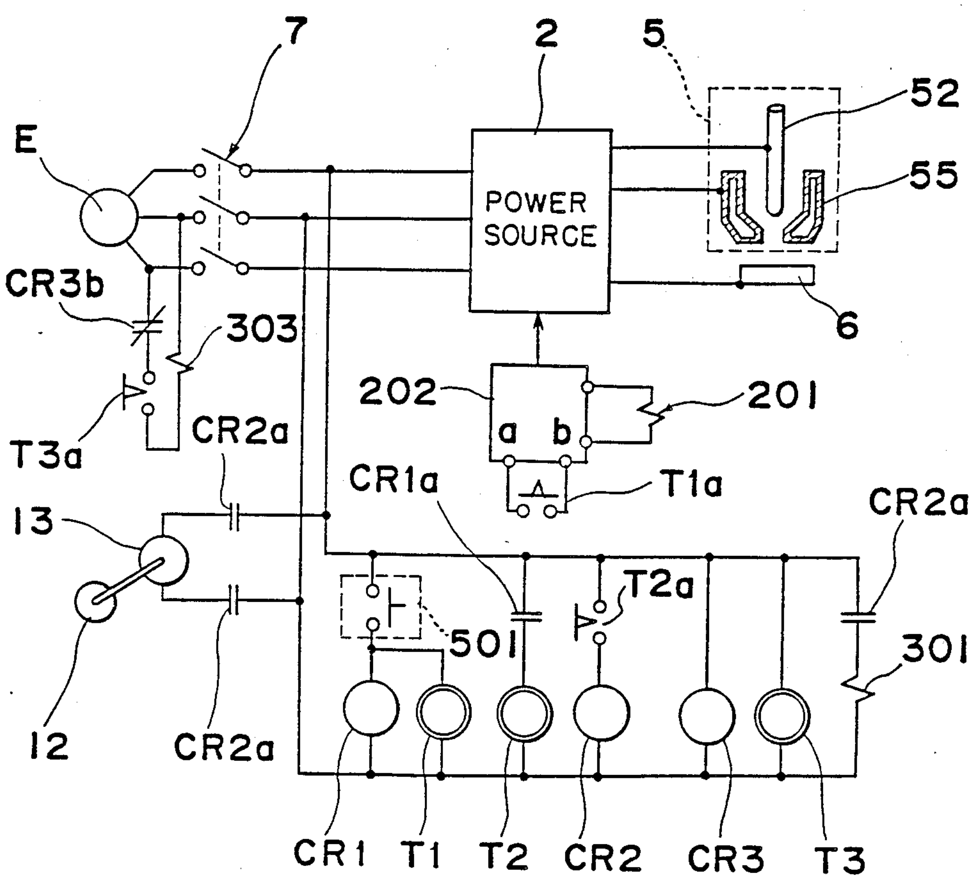
FIG. 1 shows a block diagram of an electric circuit of the plasma arc working apparatus according to the first preferred embodiment of the present invention.

FIG. 1 shows an electric circuit for a plasma arc working apparatus according to the preferred embodiment of the present invention.

As shown therein, a working electric power source unit 2 for supplying electric power to a plasma arc torch 5 and a work piece 6 is connected to an AC power source E of three phases via a power switch 7.

Between two power lines connected between the power switch 7 and the power source unit 2, first to third relays CR1, CR2 and CR3 and a motor 3 for driving a water pump 12 are connected in parallel with each other.

In FIG. 1, CR1a and CR2a indicate normally open contacts of the first and second relays CR1 and CR2 and CR3b indicates a normally closed contact of the third relay CR3. Further, between said two power lines, first to third timers T1, T2 and T3 are connected. The first timer T1 is connected, via a manual operation switch 501, in parallel with the first relay CR1 therebetween and the second timer T2 is connected in series with the normally open contact CR1a therebetween. Among three timers, the first and third timers T1 and T3 having normally open contacts T1a and T3a are of a type of delayed set and instantaneous reset and the second timer T2 is of a type of instantaneous set and delayed reset. A normally open contact T2a of the second timer T2 is connected in series with the second relay CR2 between said two power lines.

In FIG. 1, a control circuit 202 of the power source unit 2 is represented in a manner separated therefrom. The control circuit 202 generates a working electric power while two terminals "a" and "b" are kept in a short circuit state by the normally open contact T1a of the first timer T1 and, when the contact T1a is opened, the working power is cut off.

Figure 2:
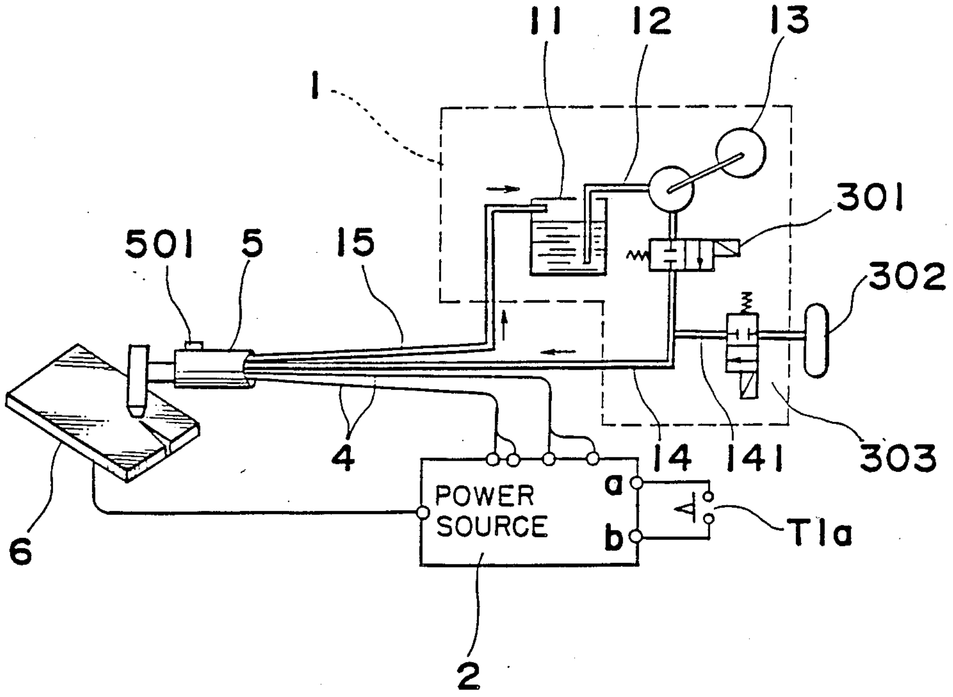
FIG. 2 shows a cooling water circulating system of the plasma arc working apparatus shown in FIG. 1.

FIG. 2 is a schematic diagram for showing a water cooling system of the plasma arc working apparatus.

As is apparent from comparison of FIG. 2 with FIG. 10 showing a conventional water circulating system, an electro-magnetic valve 301 of two positions is connected to a cooling water supply conduit 14 downstream with respect to the water pump 12. This valve stops the supply of cooling water at the position shown in FIG. 2 and, when switched to the other position, allows cooling water to be fed to the torch 5 in accordance to the drive of the water pump 12.

Further, at a position of the water supply conduit 14 downstream of the valve 301, one end of a gas conduit 141 is connected thereto the other end of which is connected to a source 302 for pressurized gas. Positioned in the path of the gas conduit 141, is an electro-magnetic valve 303 of two positions for controlling a gas flow from the gas source 302. A gas source of the plasma-forming gas or pressurized air source is available for the gas source 302.

Figure 3:
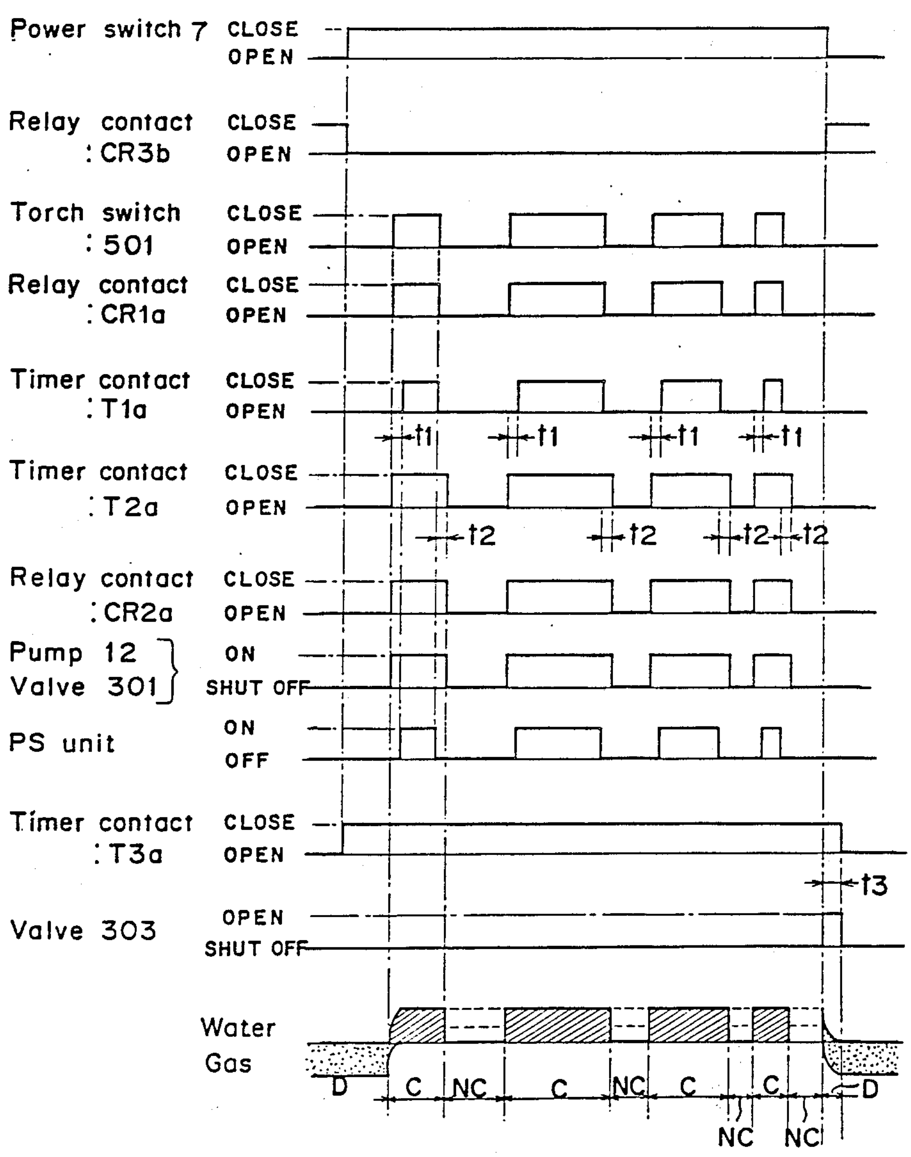
FIG. 3 is a time chart showing actions of individual element of the electric circuit shown in FIG. 1.

Next, the operation of the electric circuit shown in FIG. 1 will be explained referring to FIG. 3 showing a time chart thereof.

When the power switch 7 is switched on upon the start of working operation, the third relay CR3 is energized and the third timer T3 is started simultaneously. Although the normally open contact T3a of the third timer T3 is closed instantaneously in response to this, the electromagnetic valve 303 is kept at the cut position thereof since the normally closed contact CR3b of the third relay CR3 is opened simultaneously.

When an operator pushes the manual switch 501 of the torch 5 in order to start the working operation, the first relay CR1 is energized and, thereby, the contact CR1a thereof is closed. The second timer T2 is energized as soon as the contact CR1a is closed and the contact T2a of instantaneous close and delayed open type is closed to energize the second relay CR2. When the same is energized, all of the contacts CR2a thereof are closed simultaneously. Accordingly, the motor 13 is started to drive the water pump 12 in order to feed the cooling water to the torch 5 and, also, the electro-magnetic valve 301 is energized to allow the supply of cooling water.

On the other hand, the first timer T1 is energized when the manual switch 501 of the torch 5 is switched on. The contact T1a of the first timer T1 is closed after a predetermined time interval $t_1$ has been passed from the start of the first timer T1. Thus, the power source unit 2 applies a DC electric power between the torch 5 and a work piece 6 and, simultaneously, the electro-magnetic valve 201 for supplying the plasma-forming gas is energized to start the supply of the plasma-forming gas.

In this stage, a usual arc starting process is performed by applying a high voltage of high frequency between the main electrode 52 and the tip electrode 55 in order to generate a pilot arc therebetween. Then, a main arc is generated by the pilot arc. The main arc is formed into a fine plasma arc by the flow of the plasma-forming gas which is supplied, via the valve 201, to the space around the main electrode 52. The work piece 6 is heated to melt by the plasma arc jet spouting out of the jet hole 551. The working operation to the work 6 is performed by moving the torch 5 along a desired path.

Upon the finish of the working operation, the manual switch 501 of the torch 5 is released and, thereby, the first relay CR1 and the first timer T1 are deenergized. Due to this, the contacts CR1a and T1a are instantaneously opened. Since the power source unit 2 stops the supply of electric power when the contact T1a is opened, the plasma arc jet from the torch 5 disappears. Further, the second timer T2 is deenergized by the open of the contact CR1a and, after a predetermined time interval $t_2$, therefrom, the contact T2a is opened.

When the contact T2a is opened, the contacts CR2a of the second relay CR2 are opened to stop the motor 13 and, thereby, the water pump 12. Also, the valve 301 is deenergized to stop the cooling water. In this stage, the cooling water supplied until the stop of the pump 12 remains in the supplying and draining conduits 14 and 15 and in the torch 5.

When the torch switch 5 is operated again to restart the working operation, the pump 12 is driven again to feed the cooling water and the valve 301 is energized to allow the supply of the cooling water. After the predetermined time interval $t_1$ of the first timer T1, the power source unit 2 applies the high power between the torch 5 and the work to restart the working operation.

When the working operation has been completed, the power switch 7 is switched off. Due to this, the contact CR3b of the third relay CR3 is closed at once. At that time, the third timer T3 is deenergized, however, the contact T3a is held in the closed state for the time interval $t_3$ set by the third timer T3. Accordingly, the valve 303 connected on the way of the gas conduit 141 is energized to introduce the pressurized gas from the gas source 302 to the water supply conduit 14. This pressurized gas forcibly discharges the remaining cooling water into the reservoir tank 11 through the drain conduit 15. Therefore, it becomes possible to prevent freezing of the remaining cooling water in the winter season and leaking upon the maintenance operation.

According to the present preferred embodiment as shown at the bottom portion of FIG. 3, the cooling water is started to circulate when the torch switch 501 is operated and the working operation by the plasma arc is started after the time interval $t_1$ set by the first timer T1. Further, when the torch switch 501 is released, the plasma arc is stopped. Then, the water pump 12 is stopped after the time interval $t_2$ set by the second timer T2. Due to this, the torch 5 having been heated during the working operation is reasonably cooled by the circulating cooling water.

On the other hand, when the power switch 7 is switched off after a series of the working operation has been completed, the cooling water remaining in the conduits 14 and 15 and the torch 5 is automatically collected in the reservoir tank 11.

In the bottom portion of FIG. 3, a symbol "C" indicates the circulation of cooling water and a symbol "NC" indicates a state wherein neither the circulation of the cooling water nor the discharge thereof are done. A symbol "D" indicates the discharge of the cooling water by the pressurized gas.

Although the control circuit is constituted using relays and timers in the present preferred embodiment, it may be constituted using semiconductor logic devices. Also, a switch of self-hold type may be used for the torch switch 501.

Further, according to the present invention, it becomes possible to install the cooling water circulator in the power source unit 2 since a water pump having a relatively small capacity can be used because of the fact that the duty ratio of the pump is lowered. This enables the manufacture of the power source unit including the cooling water circulating system being much more compact and easy to handle.

Next, manner for setting respective timers will be explained.

In the preferred embodiment shown in FIG. 1, the first timer T1 is set to have a time interval needed until the cooling water is fed into the torch 5 upon starting the working operation. The time interval of the first timer T1 should be set relatively long for the start of the daily work since the cooling water has been drained from the conduits and the torch entirely. On the contrary, upon restarting the working apparatus after relatively short suspension, it can be set at a relatively short time interval necessary for running the cooling water since the cooling water having been supplied during the latest working operation remains therein at that time. However, it is not so efficient to reset the time interval of the first timer T1 every start of the working operation and, if it is set too short to start the daily working operation, the torch might be overheated.

In order to avoid such a dangerous accident, it may be unchangeably set at a relatively long time from the first time. Due to this, a relatively long waiting time become necessary for restarting the next actual working operation after pressing the torch switch 501 and, thereby, the efficiency of the working operation is lowered.

Figure 4:
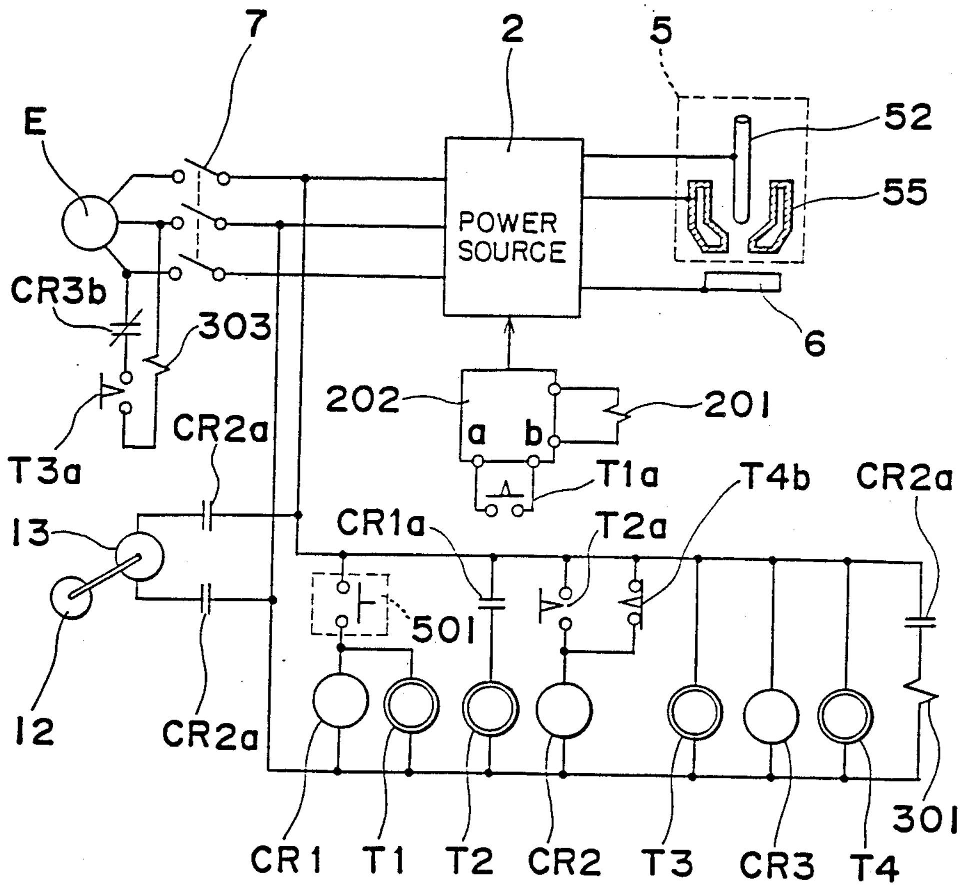
FIG. 4 shows a block diagram of an electric circuit of the plasma arc working apparatus according to the second preferred embodiment of the present invention.

FIG. 4 shows an electric circuit according to the second preferred embodiment of the present invention which is intended to minimize the waiting time mentioned above.

In comparison of FIG. 4 with FIG. 1, a fourth timer T4 is connected between the power source control circuit in parallel with other timers T1 to T3 and a contact T4b of delayed close and instantaneous open type is connected in parallel with the normal open contact T2a of the second timer T2.

Figure 5:
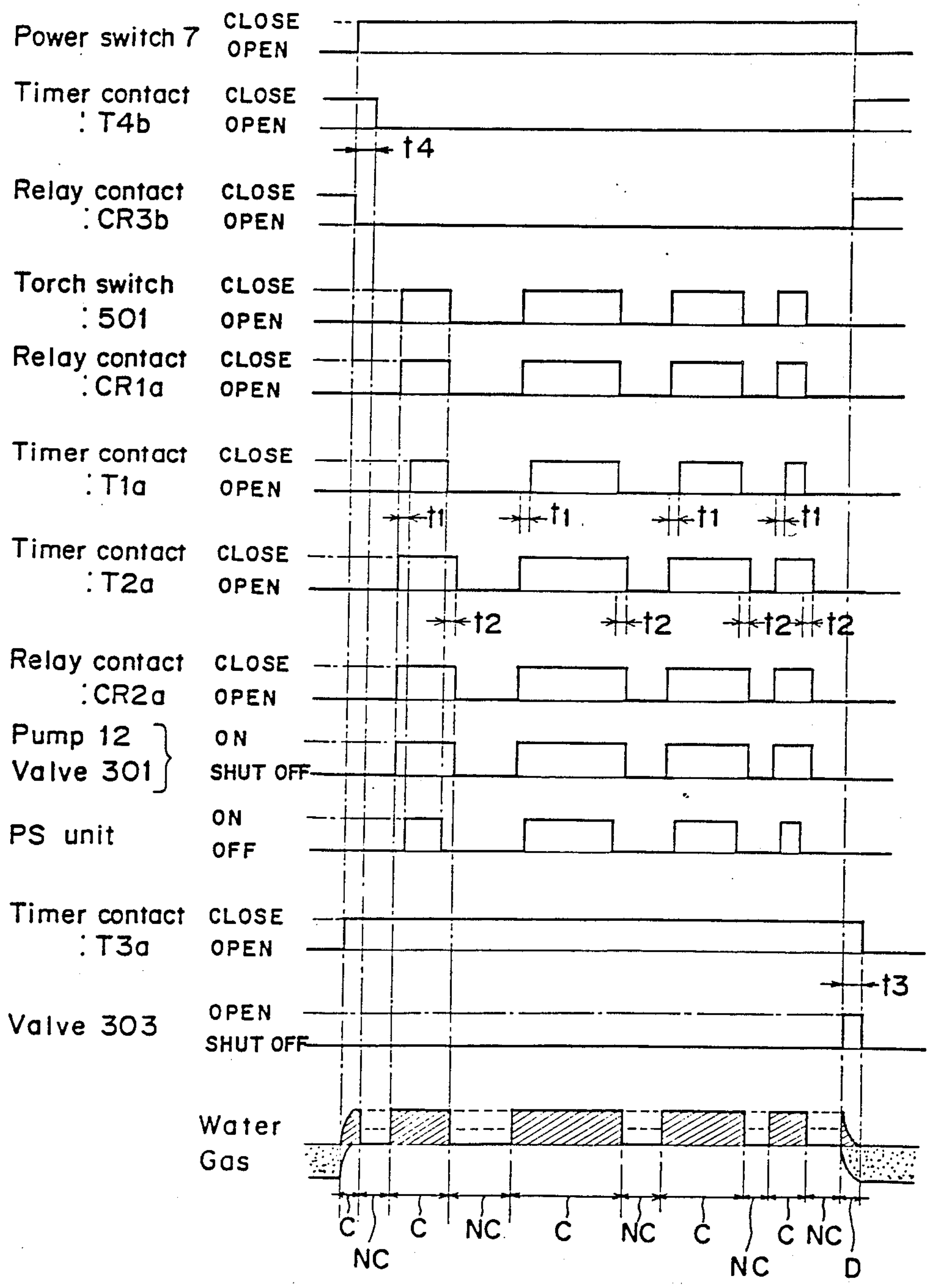
FIG. 5 is a time chart showing actions of individual elements of the electric circuit shown in FIG. 4.

In this preferred embodiment, as shown in FIG. 5, when the power switch 7 is switched on in order to start the daily work, the fourth timer T4 is started at once and the second relay CR2 is energized by the normally closed contact T4b of the fourth timer T4.

Further, the normally open contact CR2a of the second relay CR2 is closed to start the electric motor 3 and, thereby, the water pump 12 is started to feed the cooling water. When the time interval set in the fourth timer elapsed, the normally closed contact T4b is opened to de-energize the second relay CR2 and, thereby, the contact CR2a thereof is closed. As the result, the water pump 12 is stopped.

Thereafter, when the operator operates the torch switch 501 for the working operation, the first relay CR1 and the first timer T1 are energized similarly to the first preferred embodiment and, thereby, the second timer T2 is energized. When the time interval set in the first timer T1 elapsed, the electric power unit 2 applies the power to the torch 5 for starting the working operation. When the torch switch 501 is released upon completion of the working operation, the contact CR1a of the first relay CR1 and the contact T1a of the first timer T1 are opened, respectively. As the result, the power supply is stopped. But the water pump 12 continues the water supply for the delay time, and, thereafter, is stopped.

As is apparent from the aforementioned, the water pump 12 is driven for a predetermined time interval set by the fourth timer T4 when the power switch 7 is operated, and, thereby, the torch 5 is filled with the cooling water upon starting the daily working operation. Accordingly, the time interval $t_1$ to be set in the first timer T1 can be minimized and, thereby, the waiting time necessary for starting the next working operation can be minimized. If the water pump 12 has an excellent response, the first timer T1 can be omitted and, in place of that, the power source unit 2 can be started by the normally open switch CR1a of the first relay CR1. Further, although the time interval for the fourth timer T4 is set at a relatively long time interval, the waiting time for respective working operation is hardly affected thereby since the fourth timer T4 is operated only one time upon starting the daily work.

In the bottom portion of FIG. 5, symbols "C", "NC" and "D" are used similarly as those in FIG. 3.

In the preferred embodiment shown in FIG. 4, it is possible to arrange a pressure switch for detecting the pressure of the cooling water on the way of the conduit of the cooling water, for example, the drain conduit 15, in place of the fourth timer T4. In this case, a normally closed contact of the pressure switch is connected in parallel with the normally open contact T2a of the second timer T2 in place of the normally closed contact T4b of the fourth timer T4. According to this composition, when the power switch 7 is operated, the second relay CR2 is energized to start the supply of the cooling water by the water pump 12 and, when the torch 5 is filled with the cooling water having been fed by the water pump 12, the pressure switch detects an increase of the pressure in the conduit by opening the normally closed contact of the pressure switch. Therefore, the second relay CR2 is de-energized to stop the water pump 12.

Also, in each of the preferred embodiments shown in FIGS. 1 and 4, the water pump 12 is stopped after continuing the operation thereof for a delay time by the second timer upon completion of respective working operation and, when the torch switch 7 was operated again, the water pump 12 is started again. However, if the time interval of the second timer T2 is set at a relatively long time interval, the water pump 12 is kept running for a short suspension of the working operation. This contributes to decrease the frequency in the start and stop of the water pump 12.

Figure 6:
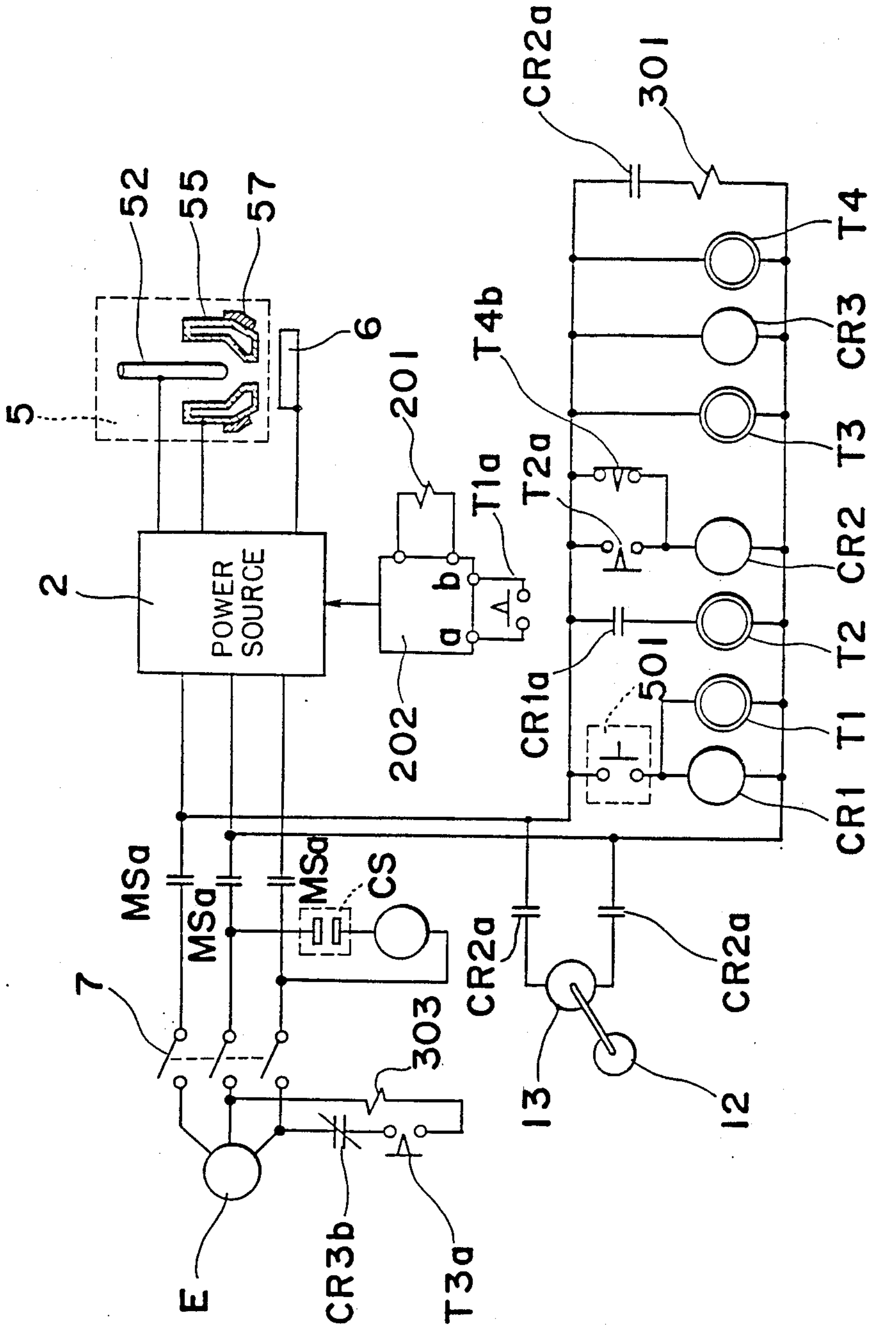
FIG. 6 shows a block diagram of the electric circuit of the plasma arc working apparatus according to the third preferred embodiment of the present invention, which has the structure of the torch as shown in FIG. 12.

FIG. 6 shows an electric circuit of the third preferred embodiment of the present invention which is applied to the plasma arc torch of water cooling type having the protection cap arranged to cover the outer periphery of the tip electrode, as shown in FIG. 12.

In the third preferred embodiment, there is provided an electro-magnetic contactor MS in addition to the composition of the second preferred embodiment, which is energized by a contact CS to be closed when the protection cap is mounted. The contactor MS has three normally open contacts MSa and each of them is connected to respective connection line between the power switch 7 and the power source unit 2.

The electro-magnetic contactor MS is kept energized as far as the protection cap 57 has been mounted on the torch body correctly in order to cover the tip electrode 55 and, accordingly, all of the contacts MSa are kept in the closed state. Thus, in this state, the electric circuit of the third preferred embodiment acts in the same manner as that of the second preferred embodiment shown in FIG. 4.

However, when the detection cap 57 is removed from the torch body for checking, repairing or exchanging the tip and main electrodes 55 and 52, the electro-magnetic contactor MS is deenergized and, thereby, the power supply to the power source unit 2 is cut off. The power supply to the control circuit is also cut off at the same time, the electro-magnetic valve 301 is deenergized to stop the supply of the cooling water and, further, both of the third relay CR3 and the third timer T3 are deenergized simultaneously. Due to this, the electro-magnetic valve 303 is energized to introduce the pressurized gas from the water supply conduit 14 in order to drain the cooling water remaining in the circulating system therefrom. When the time interval set in the third timer T3 has elapsed, the valve 303 is deenergized to stop the supply of the pressurized gas.

When the protection cap 57 is mounted on the torch body having been reassembled after completion of checking, repairing or exchanging operation, the contact CS is closed to energize the electro-magnetic contactor MS again and, thereby, the power supply to the power source unit 2 and the control circuit therefor is resumed. Due to this, the second relay CR2 is energized to drive the water pump 12 for the time interval set in the fourth timer T4 in order to fill the water circulating system with the cooling water. Thereafter, when the torch switch 501 is operated, the working operation is started in the same manner as that in the first or second preferred embodiment.

The drainage of the cooling water in the circulating system is performed also in the third preferred embodiment as far as the protection cap has been set correctly.

Figure 7:
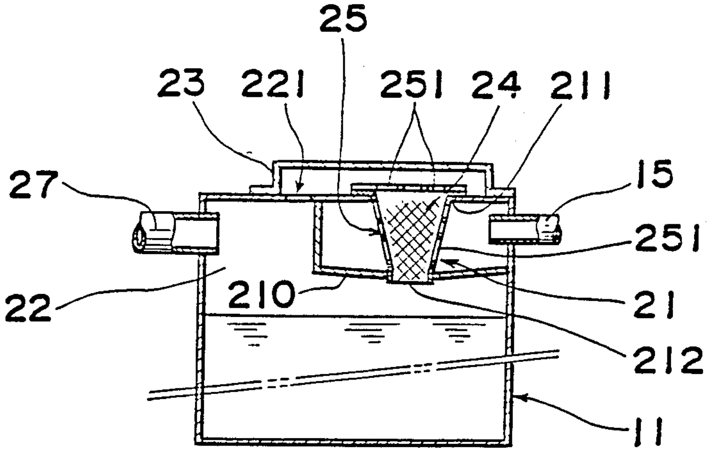
FIGS. 7, 8 and 9(A) are cross-sectional views of the reservoir tank suitable for the plasma arc working apparatus of water cooling type according to the present invention.

FIG. 7 shows a reservoir tank suitable for the circulating system of the cooling water.

As shown in FIG. 7, the reservoir tank 11 has an upper chamber 21 which is partitioned by a wall member 210 from the upper space 22 of the tank 11. In the center portion of the upper chamber 21, a conical cage-like member 25 having a plenty of perforations 251 is supported downwardly in such a manner that upper and lower ends thereof are fitted into apertures 211 and 212 which are formed on the upper plate of the tank and the bottom wall of the wall member 210, respectively. The cage-like member 25 is filled with porous material 24 such as steel-wool made of stainless steel. Further, there is provided a cover plate 23 on the upper wall of the tank 11 so as to communicate the upper aperture 211 of the cage-like member 25 and an aperture 221 formed on the upper wall of the tank 11. The drain conduit 15 is connected to the upper chamber 21 from the outside of the tank 11 and a gas release pipe 27 is supported by one of side walls of the tank 11 so as to communicate the upper space 22 of the tank 11 to the atmosphere.

The cooling water is replenished to the reservoir tank 11 through a supply conduit (not shown) and is supplied from the tank 11 to the torch 5 through the supply conduit 14 (not shown in FIG. 7) connected to the bottom portion of the tank 11. Upon cleaning the tank 11, the cooling water therein is drained by a drain conduit (not shown) connected to the bottom of the tank 11.

In this structure of the reservoir tank 11, the pressurized gas for draining the remaining cooling water is discharged from the drain conduit 15 into the upper chamber 21 together with the remaining cooling water and is released through a gas passage formed by the cage-like member 25, the upper aperture 211 of the upper chamber 21, the space defined by the cover plate 23, the aperture 221, the space in the tank 11 and the gas release pipe 27.

The cooling water discharged in the upper chamber 21 is collected in the tank through the cage-like member 24 and the lower aperture 212 of the upper chamber 21.

Since the pressure of the pressurized gas is well decreased by the porous material 24 in the cage-like member 25, the cooling water in the tank is spilled therefrom by the pressurized gas.

As to the porous material 24, pieces with a lot of visible holes made of ceramic or stainless steel can be used in place of steel wool. In this case, pieces are stacked randomly in the cage-like member 25 so as to have gaps among them into which the pressurized gas flows when discharged in the upper chamber 21.

Figure 8:
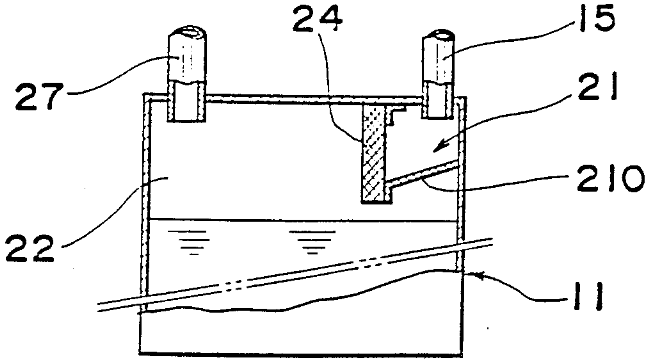

FIG. 8 shows another example of the reservoir tank 11. In this example, the upper chamber 21 defined by the wall member 210 has a side aperture and the side aperture is covered by a porous element 24 which is made by piling punched plates of stainless steel or ceramic plates having a lot of visible perforations up randomly.

FIGS. 9(A) and 9(B) show one more example of the reservoir tank 11.

In this example, a plug-like member 31 is fixed by a nut member 32 in the upper space 22 of the tank 11. The plug-like member 31 is substantially comprised of an inner cylinder member 311, an outer cylinder member 312 and porous material 313 such as steel wool inserted between the inner and outer cylinder members 311 and 312.

The drain conduit 15 (not shown in FIG. 9(A)) is connected to the outer end of the inner cylinder member 311 which protrudes outside of the tank 11. The cooling water or the pressurized gas discharged from the drain conduit 15 into the internal upper chamber 21 of the inner cylinder member 311 passes through a lot of through holes 314 provided in the range of the portion thereof located inside of the tank 11 and is decelerated by the porous material 313. Then, the decelerated cooling water or gas flows into the upper space 22 of the tank 11 through a lot of through holes 315 provided in the range of the portion thereof located inside of the tank 11.

Since the pressure of the pressurized gas is decreased by the porous material 313, no cooling water is spilled out of the tank 11 similarly to the tanks shown in FIGS. 7 and 8.

If the through hole 314 of the inner cylindric member 311 and the through hole 315 of the outer cylindric member 312 are off-set with each other with respect to the center of the plug-like member 31, as shown in FIG. 9(B), the pressure of the pressurized gas is decreased much more.

It is understood that various other modifications will be apparent to and can be readily made by those skilled in the art without departing from the scope and spirit of the prêsent invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A plasma arc working apparatus of water cooling type wherein a plasma arc torch is connected to a working power source device and a circulation system for cooling water is provided for feeding the cooling water in a reservoir tank through the inner space of the torch by a water feeding pump and returning the same to the reservoir tank through a circulating passage having at least two separate inputs, comprising:

- a conduit comprising a first input of said circulating passage for feeding said cooling water;
- a conduit comprising a second input of said circulating passage for introducing pressurized gas into a feeding side of said circulation passage;
- a control circuit for controlling said water feeding pump which starts said water feeding pump when the working electric power is applied to said plasma arc torch and stops the same when the working power is cut off; and
- a pressurized gas introducing means for automatically introducing said pressurized gas, via said conduit, into said circulation passage for a pre determined time interval just after the power supply to said power device was cut off, whereby the cooling water remaining in said circulation passage including said torch is forcibly discharged therefrom.

2. Plasma arc working apparatus of water cooling type according to claim 1, wherein said control circuit for controlling said water feeding pump starts to drive said water feeding pump at a predetermined time prior to supply of the output from said working power source device to said torch and stops the same at a predetermined time delayed from stop of the supply of the output power.

3. Plasma arc working apparatus of water cooling type according to claim 1 or 2 wherein said water feeding pump of said circulation system is driven for a predetermined time interval when an electric power is supplied to said power source device.

4. Plasma arc working apparatus of water cooling type according to claim 1, wherein said reservoir tank has an upper chamber therein to which the drain end of said circulation passage is connected, said upper chamber being partitioned from the inner space of said reservoir tank by a partition wall supporting a porous element for decreasing the pressure of said pressurized gas discharged into said inner chamber.

5. Plasma arc working apparatus of water cooling type according to claim 1, wherein said torch provides a protection cap for covering a tip electrode thereof and a detection means for detecting an attachment of said protection cap to said torch and, further, a switching means for supplying the electric power to said working power source device in accordance with a detection signal from said detection means.

* * * * *

UNITED STATES PATENT AND TRADEMARK OFFICE
CERTIFICATE OF CORRECTION

PATENT NO. : 4,916,283

DATED : April 10, 1990

INVENTOR(S) : Moritoshi Nagasaka, et al.

It is certified that error appears in the above-identified patent and that said Letters Patent is hereby corrected as shown below:

Column 1, lines 22 & 23: "pump 12 water" should read as --pump 12. A water--

Column 1, line 26: "having used" should read as --having been used--

Column 1, line 31: delete "or"

Column 1, line 62: "5 provided" should read as --5 is provided--

Column 2, line 14: "which provided" should read as --which is provided--

Column 2, line 55: delete "a"

Column 2, line 55: "As the" should read as --As a--

Column 3, line 12: "work 6" should read as --work piece 6--

UNITED STATES PATENT AND TRADEMARK OFFICE

CERTIFICATE OF CORRECTION

PATENT NO. : 4,916,283

DATED : April 10, 1990

INVENTOR(S) : Moritoshi Nagasaka, et al.

It is certified that error appears in the above-identified patent and that said Letters Patent is hereby corrected as shown below:

Column 7, line 14: "Next, manner" should read as --Next, the manner--

Column 10, line 17: "is spilled" should read as --is never spilled--

Column 10,line 55: "by the" should read as --by passing the--

Signed and Sealed this

Twenty-eighth Day of May, 1991

*Attest:*

HARRY F. MANBECK, JR.

*Attesting Officer*

*Commissioner of Patents and Trademarks*